United States Patent

Beausoleil

[15] 3,648,254

[45] Mar. 7, 1972

[54] HIGH-SPEED ASSOCIATIVE MEMORY

[72] Inventor: William F. Beausoleil, Poughkeepsie, N.Y.

[73] Assignee: International Business Machines Corporation, Armonk, N.Y.

[22] Filed: Dec. 31, 1969

[21] Appl. No.: 889,434

[52] U.S. Cl. ..........340/172.5, 340/173

[51] Int. Cl. ..........G06f 7/34

[58] Field of Search ..........340/172.5, 173

[56] References Cited

UNITED STATES PATENTS

| | | | |
|---|---|---|---|
| 3,425,423 | 3/1969 | Fuller et al. | 340/172.5 |
| 3,471,835 | 10/1969 | Gribble et al. | 340/172.5 |
| 3,441,912 | 4/1969 | Henle | 340/172.5 |
| 3,340,514 | 9/1967 | Swift | 340/172.5 |
| 3,388,383 | 7/1968 | Shivdasani et al. | 340/172.5 |
| 3,478,325 | 11/1969 | Oeters et al. | 340/172.5 |

*Primary Examiner*—Paul J. Henon
*Assistant Examiner*—Mark Edward Nusbaum
*Attorney*—Hanifin and Jancin and Owen L. Lamb

[57] ABSTRACT

An associative search apparatus for an electronic bulk storage in which data are stored in parallel by word in a plurality of memory elements in which data bits are electronically rotatable. The memory elements are selectable by a memory selection matrix. Search tables are organized on a modular basis so that the simultaneous search of many table entries is accomplished at one time. Smaller or larger logical entries are searched within the system by executing several search operations. The first search operation marks the location of where word match conditions occurred in the first table search. The second search operation compares the second search argument against the second table only at the same relative positions where matches occurred in the first table. Marking enables any table regardless of size to be searched by using the results of a previous search operation to determine the entries to be searched on subsequent search operations.

16 Claims, 4 Drawing Figures

INVENTOR
WILLIAM F BEAUSOLEIL

BY Owen Lamb

ATTORNEY

HIGH-SPEED ASSOCIATIVE MEMORY

BACKGROUND OF THE INVENTION

The invention relates to information retrieval and more particularly to the associative searching of auxiliary storage devices for use with a data-processing system.

This application is an improvement over the invention disclosed in copending application, Ser. No. 889,435 entitled "Auxiliary Storage Apparatus" by William F. Beausoleil, Fred A. Ordemann, Jr., Wilbur D. Pricer, and Norbert G. Vogl, Jr., filed on, and incorporated herein by reference.

Data processing involves the management of large amounts of information. The user of the system has a need to both access a large amount of data and also has the need to retrieve rapidly and accurately specifically identified data records that relate to a specific problem.

There are many information retrieval systems which include methods and apparatus for recovering specific information from stored data. Associative storages have been developed in which storage locations are identified by the contents of the location and not by the particular physical address of the location. In a rapid access associative memory, simultaneous comparisons are made of every word stored in the memory against the contents of an interrogation register. A match signal identifies those words that compare with the word in the interrogation register. These match signals are employed for reading out matched words. Partial words in the memory are searched if the interrogation register is loaded with only part of a word, or if a mask register is used to block out those portions of the word upon which a search is not desired. These memories, while virtually instantaneous, are very expensive.

As an alternative, information retrieval systems have been devised in which information is searched sequentially. In these systems the data stored in sequential memory locations are read and compared against information stored in an interrogation register. When a match occurs, the desired information has been found. These systems, while inexpensive, tend to be very slow and cannot be used to advantage in a large data base system.

SUMMARY OF THE INVENTION

It is a primary object of this invention to provide a high speed associative bulk storage with low access time and improved performance.

It is also an object of this invention to provide a method and means of rapidly searching for desired data stored in a sequential access storage device.

It is a further object of this invention to provide an improved table lookup device having the ability of simultaneously searching many table entries.

Briefly, the above objects are accomplished in accordance with the invention by providing a storage device employing memory elements which are organized on a modular basis and in which data bits are electronically rotatable. A number of memory elements are selected at one time, and the bits are rotated (shifted) in unison. A search of these elements is accomplished simultaneously, with means provided for marking addresses within the elements at which desired data is located.

More specifically, in accordance with an aspect of the invention, a plurality of multibit memory elements in which data bits can be shifted or electronically rotated are arranged in columns and rows in memory planes, one plane for each bit position of a word. The memory elements are further organized on a modular basis such that a plurality of memory elements are associated with one particular module. Address decoding means are provided for selecting a column and a row at each module to thereby select one memory element location at each module on each plane. Means are provided for shifting or electronically rotating the bits stored in the selected memory elements in unison to thereby read out words in parallel, each bit of a word being read out from a corresponding module on a corresponding memory plane.

In accordance with an aspect of the invention, comparison logic is provided at each module to compare the data read from the module with a search key which represents the attributes of the data to be retrieved from the memory. The compare logic generates a signal which indicates whether or not the data represented by the key matches the data read from the module.

In accordance with another aspect of the invention, timing circuits and positioning logic are provided to electronically rotate the selected memory elements at high speed such that successive words are read from each memory module. A separate mark bit position is provided which is selected along with memory elements at each module. Means are provided for storing indicia in the mark bit position indicating those word positions in the selected memory elements of the module at which a data comparison match results.

The invention has the advantage that by partitioning the memory into modules, several modules can be sequentially read in parallel to thereby perform a more rapid search operation then has been possible in the past.

The invention has the further advantage that multiple table entries can be searched at one time.

The foregoing and other objects, features and advantages of the invention will be apparent from the following more particular description of a preferred embodiment of the invention, as illustrated in the accompanying drawings.

BRIEF DESCRIPTION OF THE PREFERRED EMBODIMENT

Briefly, a preferred embodiment of the invention comprises a bulk storage made up of shift registers arranged in a three dimensional memory matrix. The memory combines the attributes of a random access storage device in which access can be made directly to any storage regardless of its physical position relative to previously referenced information, and the attributes of sequential access storage devices in which information must be accessed sequentially. Such a system is more fully described in the aforementioned copending application, Ser. No. 889,435 entitled "Auxiliary Storage Apparatus" by William F. Beausoleil, Fred A. Ordemann, Jr., Wilbur D. Pricer and Norbert G. Vogl, Jr.

Each shift register in the matrix has the capacity to store a plurality of bits, and can be shifted so that these bits are presented in a serial manner at the output of the shift register. A feedback loop is provided so that the data can be continuously recirculated or electronically rotated. Each shift register sequentially stores data corresponding to a bit position of parallel words made up of a plurality of bits. Shift registers are arranged in columns and rows in a memory plane, and are grouped in modules at each plane. One shift register per module per plane is selected at a time by energizing X- and Y-coordinates to thereby select the shift registers at the intersection of the energized coordinate. Thus, when the coordinates $X_n$ and $Y_n$ are selected, they select shift register m on the first module, m on the first plane, (the first bit position of a word), shift register m on the first module, m on the second plane, (the second bit position of a word), etc. Each plane therefore represents a bit position of the parallel word. Each module on the plane has a data output such that a data output appears for each module at the plane.

Compare logic is provided to compare the data output of each module with a search key so that whenever the data read from a selected shift register from any of the modules compares with the key, the compare logic indicates this fact.

A separate memory plane is provided for a mark bit position of each parallel word. Logic is provided at this plane responsive to the compare logic at each module to insert marking indicia at those word positions which match the search key. As successive tables are searched in the memory by selecting successive shift register locations, the indicia in the mark bit position are updated to reflect subsequent match conditions.

DETAILED DESCRIPTION OF THE PREFERRED EMBODIMENT

Figure 1:
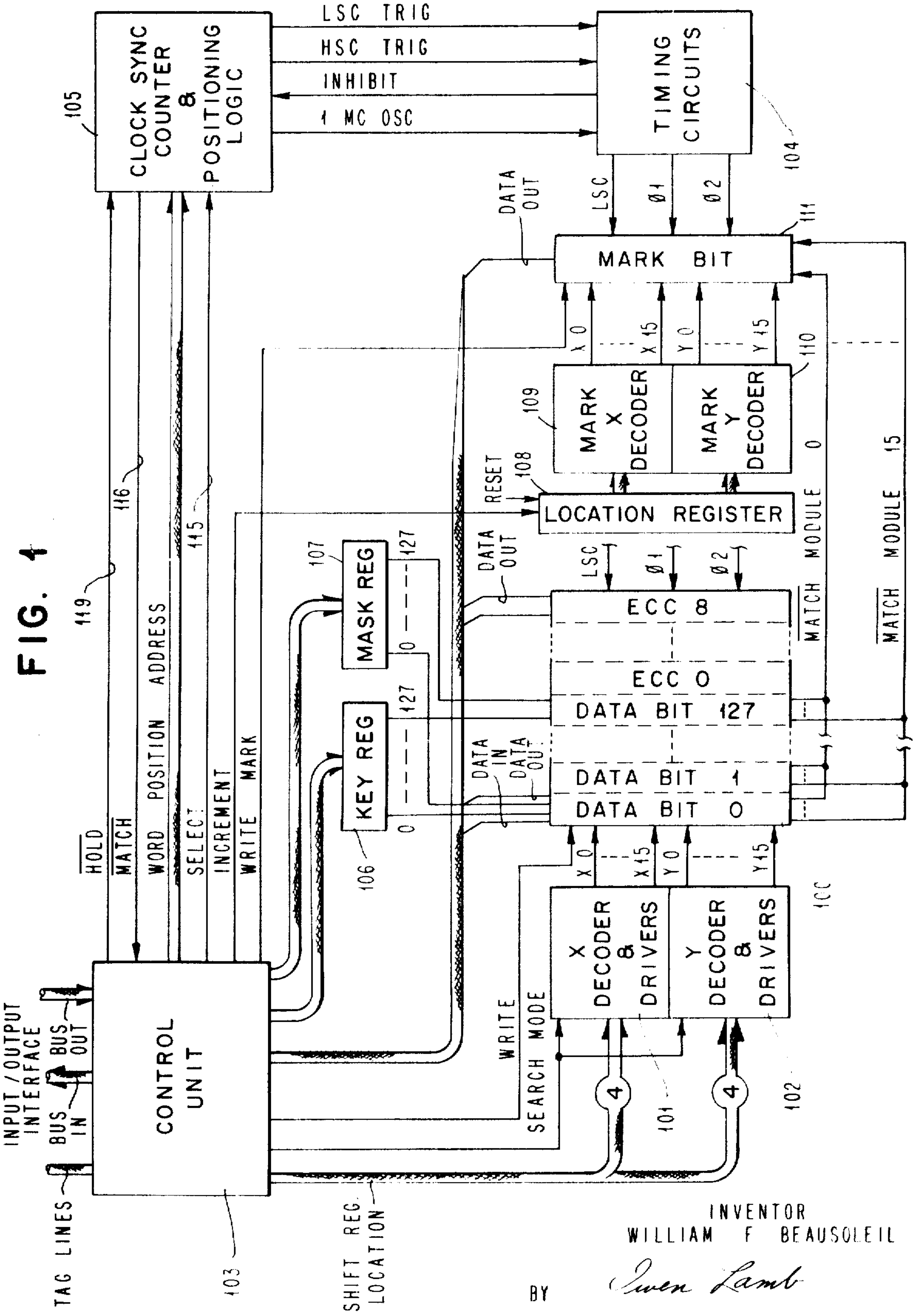
FIG. 1 is a block schematic diagram of an auxiliary storage unit in which the invention is embodied.

Referring to FIG. 1, the auxiliary storage unit comprises a storage portion 100; X and Y address decoders 101 and 102 for selecting positions within the storage 100; a mark bit storage 111; mark-X and mark-Y decoders 109 and 110; a control unit 103 for interfacing the storage with an input/output interface; timing circuits 104; a clock-synchronization counter and positioning logic 105; and a key register 106 and mask register 107 for associatively interrogating the memory 100.

Figure 2:
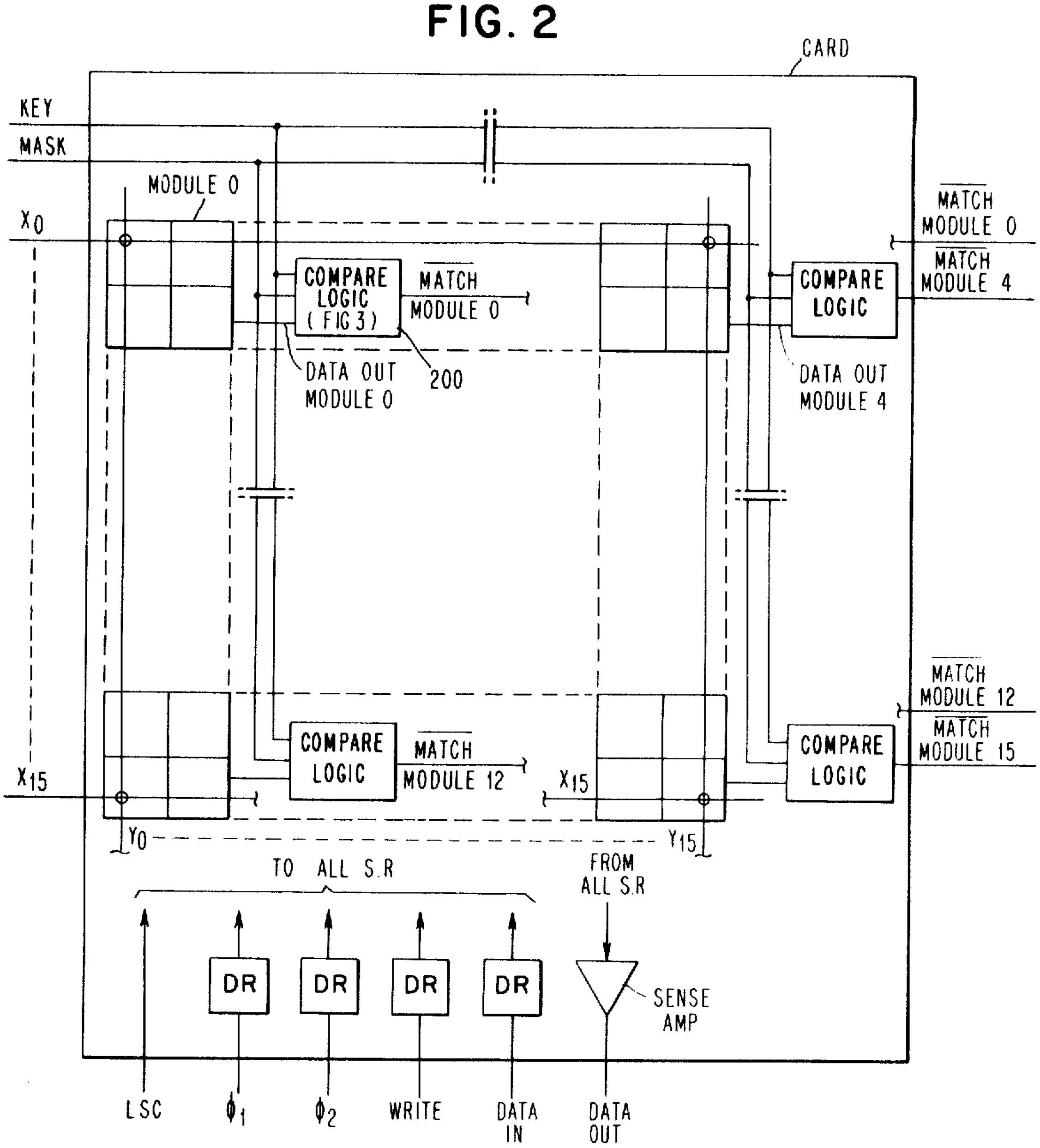
FIG. 2 is a block schematic diagram of one card of a group of cards in the storage 100 shown in FIG. 1.

The storage 100 is made up of a plurality of cards, one of which is shown in FIG. 2. Each card comprises 16 modules. Each module comprises 4 chips. There are 1,024 memory cells on each chip divided into four field effect transistor (FET) shift registers of 256 bits each. X- and Y-select lines X0–X15 and Y0–Y15 are provided on each card, connected in parallel to all of the cards in the storage.

The external selection of the storage 100 is essentially the same as that described in the above identified copending Beausoleil et al. application. The X and Y decoders 101 and 102 decode bits appearing at the shift register location bus so that one X-coordinate and one Y-coordinate is energized to thereby select a shift register location at the intersection of the energized coordinates. When the memory is to be used as an associative memory, the search mode input to the X and Y decoders 101, 102 is energized by the control unit 103. This causes more than one X and more than one Y coordinate to be energized to thereby select shift registers on each module within the memory. For example, whenever $X_m$ and $Y_m$ are energized, the mth shift register on each card in the storage is energized. The energized search mode line causes the shift register at the same relative position in each module on each card to be energized. In the example shown, in search mode, 16 shift registers are simultaneously energized, each shift register in the same relative position at each of the 16 modules on the card.

Assume that the shift register location bus contains an address which, when decoded, would normally select the shift register at the intersection of energized X-coordinate 15 and energized Y-coordinate 0. During search mode, the search mode line causes a corresponding shift register at each of the other modules to be selected. That is, the search mode line forces the selection of shift registers energized by X-coordinates X3, X7, and X11, in addition to X15. Also, the search mode line forces the energization of Y coordinates Y4, Y8, and Y12 in addition to the energization of Y0. This causes the simultaneous selection of shift registers at the intersection of all of these energized coordinates, that is, at the same relative position in each of the modules 0–15.

Each card shown in FIG. 2 contains driver circuits for clocking lines LSC (low speed clock), phase lines 01 and 02 for driving the shift registers, a write line for energizing the shift register circuits for writing, a data in line for placing data into the shift registers, and a data out line for reading data from the shift registers. The operation of these lines is more fully described in the above identified copending Beausoleil et al. patent application.

Data out lines are provided separately from each module of the card. This data out line drives compare logic 200 and is compared with a search key bit. The compare logic 200 is shown in more detail in FIG. 3.

Figure 3:
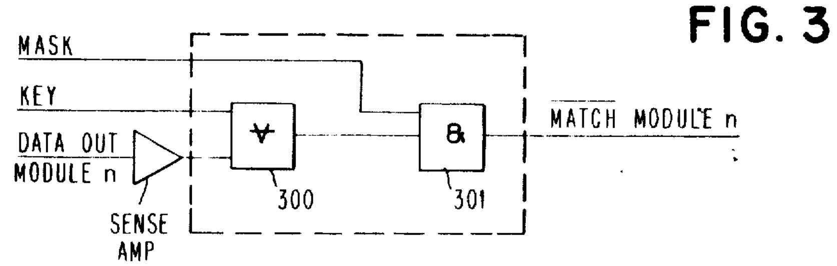
FIG. 3 is a more detailed block schematic diagram of the compare logic shown in FIG. 2.

Referring to FIG. 3, the data out line from a module drives an exclusive OR-circuit 300. A key bit is compared with the data out line, such that whenever the two do not compare, an output appears at the exclusive OR 300. An AND-circuit 301 is provided such that masking can be performed by a mask bit. If the mask bit line is deenergized, then this position is compared with the key. If the output of the AND-circuit 301 is positive, a no match condition exists at the module.

In addition to the storage portion 100, a separate mark bit position card 111 is provided (FIG. 1). This card contains 16 modules formed in an array, each module corresponding to respective modules in the storage 100. Mark-X and mark-Y decoders 109 and 110 are provided to decode an address generated by the location register 108. This register is normally reset to zero, thereby denoting shift register location 0. The mark decoders decode the contents of the location register to select appropriate X- and Y-coordinates in a manner similar to the X and Y decoders 101 and 102 when operated in the search mode. That is, the mark-X and mark-Y decoders operate to select a shift register location on each module of the card depending upon the contents of the location register 108.

Figure 4:
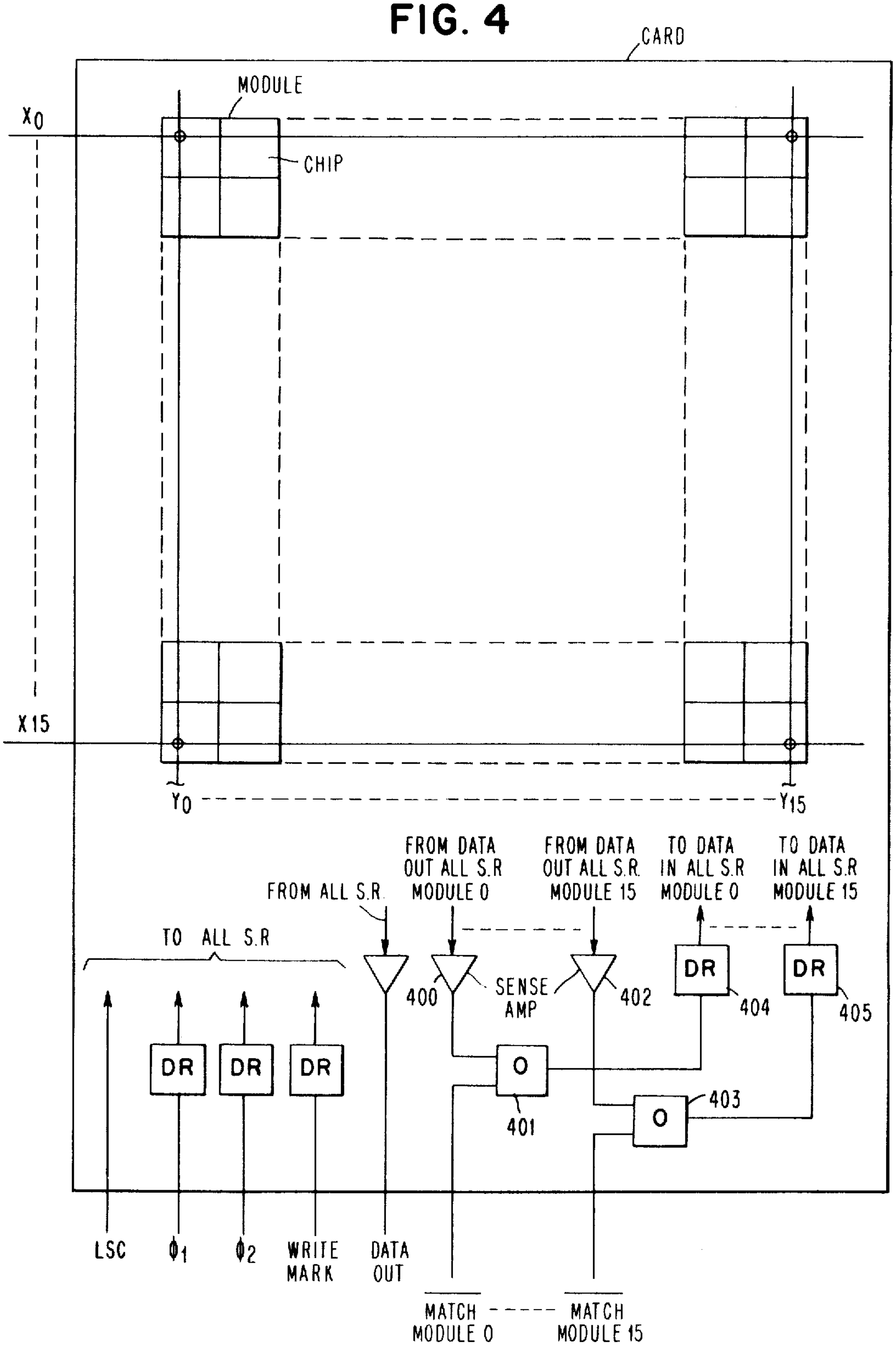
FIG. 4 is a block schematic drawing of the mark bit card 111 shown in FIG. 1.

The mark bit-position card 111 is shown in more detail in FIG. 4. The card comprises 16 modules arranged in columns and rows similar to the arrangement of FIG. 2. The card comprises further logic for separately reading data out of all shift registers on a module as shown by sense amplifiers 400 and 402. The data output line from each module energizes an OR-circuit 401...403, one OR circuit for each of the 16 modules. The other leg of each OR circuit is energized by the $\overline{\text{match}}$ output line for each module of the storage 100, as illustrated by FIG. 2. The outputs of the OR-circuits 401...403 energize drivers 404...405 which are connected to the data inputs of respective modules 0...15.

Whenever a no match condition exists at a particular module in the storage 100, a zero is written into the same relative bit position of the same relative shift register of the same relative module in the mark bit card of FIG. 4.

ASSOCIATIVE SEARCH OPERATION

The auxiliary storage of FIG. 1 can be operated either in a normal read/write mode as described in the above identified copending application of Beausoleil et al. or in a search mode.

In the search mode, the control unit operates in a manner which is similar to that described for a normal read mode and reference should be made to the above identified Beausoleil et al. application for a more complete description. In the search mode, the control unit loads the key register 106 with an interrogation word which is to be matched against words stored in the storage 100. The control unit also loads a mask register 107 to mask out those portions of the word which are not to be searched for a match. Mask register bit positions which have a 1 bit stored therein cause corresponding positions of the key register 106 to be compared with each word of the storage 100.

The control unit raises the reset line to reset the location register 108 to zero. The output of the location register drives the mark-X decoder 109 and mark-Y decoder 110. Initially, with the location register 108 reset to zero, the decoders 109 and 110 energize respective X- and Y-coordinates to thereby select the first shift register position of each module 0–15 at the mark bit plane 111.

The control unit raises the write mark line which energizes the control circuits at each of the selected shift registers at mark bit plane 111 to therefore write data into the shift registers depending upon the inputs $\overline{\text{match}}$ module 0–match module 15 (FIG. 4). The details of the write circuits at each shift register will be found in FIG. 4 of the above identified Beausoleil et al. application.

The address of the starting word of the first table to be searched is stored in the position register of control unit 103. The control unit next raises the select line 115 and the hold line 119 which drives the clock sync and positioning logic 105. As more fully described in the above identified Beausoleil et al. application, the logic 105 in conjunction with the timing circuits 104 are now energized to shift the selected shift registers in the storage 100 and the mark bit plane 111 until a match condition exists, at which time the match line 116 is deenergized. The selected shift registers have now all been advanced to the first word of the first data table to be searched. The control unit now performs a read/write operation by incrementing the position register at the control unit, and advancing the selected shift registers by controlling the select and hold lines to successively read data words from the storage 100 and to write data into the mark bit position 111 in accordance with match outputs appearing at the match module 0–match module 15 output lines. Whenever a word boundary is reached, that is, when the word position address equals 255, the position register (and hence shift register location bus) is incremented to thereby select the next sequential shift registers on each module. At the same time, the location register 108 is incremented to thereby select the next sequential shift register location on the mark bit plane 111.

Referring to FIG. 2, whenever a bit of the key word compares with one or more bits currently being read from the module 0–15 appearing at the data out line for each module, the compare logic 200 deenergizes the match module output line at the module at which the compare exists. At FIG. 4, the match module output lines are each fed to OR-circuits 401...403. When a match occurs, for example, at module 0 in the storage 100, the match module 0 line is deenergized causing the output of OR-circuit 401 to be deenergized (note that the mark bit plane 111 initially has all zeros stored therein). This causes the driver 404 to deenergize all shift registers on module 0 and hence, the selected shift register on that module to thereby write a 0 into the same relative bit position of the word which matched the key word.

The entire first table to be searched is read in this manner. Thus, every word position which does not compare with the key word has a one bit written into the mark bit position to indicate this fact. All positions in which the word does match the key word have a zero written in the corresponding mark bit position.

After the entire first table has been searched, the control unit 103 is able to read the match words out by deenergizing the search mode line, resetting the location register 108 to zero, and reading out only those word positions in storage 100 at which a 0 bit appears at the data output line of the mark bit register 111.

In the embodiment shown in FIG. 1, the storage 100 is capable of storing words of 16 bytes in length (128 data bits). Smaller or larger logical entries are searched by executing additional search operations as follows. A search application which calls for entries greater than 16 bytes, for example, 32 bytes in length, requires two search operations to extract the information. This is accomplished under control of the control unit 103. The first search operation causes marks (0 bits) to be written into the mark bit position 111 at all locations in the first table in which the data stored in the key register 106 compares with words of the storage 100 and 1 bits where they do not compare. A second search operation, utilizing a second key stored in the register 106, compares the second search argument against the second table only at the same relative positions where successful compares existed from the first search operation. This is accomplished by resetting the location register 108 to zero, and setting the word position address and shift register location (taken from the position register in the control unit 103) to the beginning address of the second table. A search mode operation is performed of the second table in the same manner as described above for the first table.

The mark bit plane 111 contains ones and zeros from the first search operation, the ones indicating those words at which no match occurred, and the zero indicating those words at which a match did occur. Referring to FIG. 4, when a match in the second table occurs, for example, at module 0, the match module 0 line is negative deenergizing one leg of the OR-circuit 401. If a match had occurred in the first table at the same word location, the output of sense amplifier 400 is negative, therefore the output of OR 401 is negative and a zero is written into the mark bit position to indicate that a match occurred at the same position of both tables. Had the previous search operation not matched at the current word position, the output of sense amplifier 400 is positive causing a one to be written into the mark bit position corresponding to the word of the second table, thereby indicating that the search operation did not result in a match in both tables at the same location.

At the conclusion of the second search operation, the mark bit position contains ones in all of those locations in which both tables did not match, and a zero in those positions in which both tables did match.

The control unit reads out the words in both tables by resetting the location register 108 to zero, selecting the beginning address of the first table, and reading data only if those positions where the mark bit position 111 has zeros therein as indicated by the data output line. By appropriate control of the control unit 103, the reading operation can switch between the two tables; or all of the entries where a match occurred in the first table can be sequentially read out, and all of the entries in the second table can be read out.

Multiple match occurrences are resolved at the control unit by providing a counter which counts marks read from mark bit plane 111. A count greater than one indicates a multiple match.

While the invention has been described with reference to a single-key register 106, mask register 107 and a single-mark bit plane 111, one having ordinary skill in the art can adapt the present invention to perform simultaneous searches with a number of search keys. This is accomplished by providing multiple search key registers, multiple mask registers and multiple mark bit positions corresponding to each key/mask pair.

While the invention has been particularly shown and described with reference to a preferred embodiment thereof, it will be understood by those skilled in the art that various changes in form and details may be made therein without departing from the spirit and scope of the invention.

What is claimed is:

1. A memory for storing data at a position address, said data accessible by presenting a position address to said memory, said position address including a word position portion,
- said memory including a plurality of memory elements in which data bits are electronically rotatable, the improvement comprising:
- addressing means for decoding said position address and for selecting and energizing a first group of memory elements at a first location corresponding to said position address and a second group of memory elements corresponding to a location bearing a predetermined relationship to said first location;
- means for storing a search argument;
- means for electronically rotating data bits stored in said selected memory elements;
- means for reading data bits from said first and second groups of memory elements; and
- means responsive to said storing means and said reading means for comparing said search argument with said data bits.

2. The combination according to claim 1 wherein said memory elements are of the type which require periodic low-speed regeneration to maintain the data stored therein;
- means for periodically regenerating data stored in said memory elements; and
- means responsive to said regeneration means for inhibiting said means for electronically rotating data bits stored in said selected memory elements for the duration of said regeneration.

3. A memory for storing data at a position address, said data accessible by presenting a position address to said memory, comprising:

a plurality of memory elements in which data bits are electronically rotatable, said elements arranged in columns and rows;

coordinate addressing means for decoding said position address and for energizing at least a first and a second coordinate to select a first memory element and for energizing at least a third coordinate to select a second memory element, means for storing a search argument;

means for electronically rotating data bits stored in said selected memory elements;

means for reading data from said first and second memory elements; and means responsive to said reading means and said storing means for comparing said search argument with said data bits.

4. The combination according to claim 3 wherein said memory elements are of the type which require periodic low speed regeneration to maintain the data stored therein;

means for periodically regenerating data stored in said memory elements; and means responsive to said regeneration means for inhibiting said means for electronically rotating data bits stored in said selected memory elements for the duration of said regeneration.

5. A memory for storing data at a location in said memory corresponding to a position address, said data accessible by presenting a position address to said memory, comprising:

a plurality of shift registers arranged in columns and rows;

X-Y-addressing means for decoding said position address and for energizing a first and second X-coordinate and one Y-coordinate to select first and second shift registers at the intersection thereof;

means for storing a search argument;

means for electronically rotating data bits stored in said selected shift registers and for maintaining an indication of the electronic position of said data bits in said selected shift registers;

means for comparing said indication of the electronic position of said data bits with said position address to thereby indicate that said data bits stored in said selected shift registers have been electronically rotated to the location in said memory corresponding to said position address, and compare logic means for comparing data stored at said location with said search argument.

6. The combination according to claim 5 wherein said shift registers comprise field effect transistors, connected as a dynamic shift register wherein data is stored and transferred by charging and discharging stray capacitance.

7. The combination according to claim 5 wherein said shift registers are of the type which require periodic low-speed regeneration to maintain the data stored therein;

means for periodically regenerating data stored in said shift registers; and means responsive to said regeneration means for inhibiting said means for electronically rotating data bits stored in said selected shift registers for the duration of said regeneration.

8. The combination according to claim 7 wherein said regenerating means includes means for electronically rotating data bits stored in all of said shift registers at least one bit position to thereby regenerate the data stored therein; and means for maintaining an indication of the electronic position of data in all unselected shift registers, independently of said means for maintaining an indication of the electronic position of said data bits in said selected shift registers.

9. The method of controlling a bulk memory of the type in which data are stored in memory elements in which data bits are electronically rotatable for searching data stored therein for datum matching a search key comprising the steps of:

rotating the data bits in a set of said elements at low speed to thereby sustain data stored therein;

selecting a first and a second subset of memory elements within said set;

electronically rotating data bits in said selected subsets of memory elements at a rate which is independent of the rate necessary to sustain data stored in said memory; and comparing data read from said first- and second-selected subsets of memory elements with said search key.

10. The method of claim 9 further comprising the steps of:

selecting a marking bit memory element concurrently with said first and second subsets; and writing marking indicia into bit positions in said marking bit memory element corresponding to positions within said subsets at which data read from said subsets matches said search key.

11. For use in a bulk memory system, a modular memory plane comprising:

an integrated circuit card having arranged thereon in columns and rows a plurality of modules, each module comprising a plurality of chips, each chip comprising a plurality of memory elements in which data bits are electronically rotatable;

X-Y-coordinate selection means for selecting within said card at least one module, and within each selected module a chip, and within said chip at least one memory element; and compare logic corresponding to each module for comparing data read from elements within each module with an external search key.

12. The combination according to claim 11 further including:

reading means connected to said memory elements in each module to thereby provide common data output for each element in said module;

whereby when said memory elements are selected by said X- and Y-coordinates, data is read from each module and compared with said search key at said compare logic corresponding to each module.

13. A bulk memory system comprising:

a first integrated circuit card having arranged thereon in columns and rows a plurality of modules, each module comprising a plurality of chips, each chip comprising a plurality of memory elements in which data bits are electronically rotatable;

said first card having compare logic corresponding to each module for comparing data read from elements within each module with an external search key and for energizing a match line;

a second integrated circuit card having arranged thereon in columns and rows a plurality of modules, each module comprising a plurality of chips, each chip comprising a plurality of memory elements;

said second card having means for reading data from a selected element, and means for writing data into said selected element;

X-Y-coordinate selection means for selecting within said first and second cards at least one module, and within each selected module a chip, and within said chip at least one memory element; and means responsive to said match line at said first card or said reading means at said second card for energizing said writing means.

14. Auxiliary storage apparatus comprising:

a plurality of multibit memory elements arranged in modules in columns and rows in memory planes, one plane for each bit position of a word;

address decoding means for selecting columns and rows to thereby select at least one memory element location on each module;

means for electronically rotating data stored in the selecte; memory elements in unison to thereby read words in parallel, each bit of a word being read from a corresponding memory plane;

means for maintaining a position count of the contents of the memory elements as they are rotated;

means for comparing the address of a particular word position with the state of said count means, such that when the two compare, the words corresponding to the word position address are accessible at each selected module; and means for simultaneously comparing the accessible words at each module with a search key.

15. The combination according to claim 14 wherein a characteristic of the memory elements is that data are stored therein on a temporary basis and must be regenerated periodically, said apparatus further comprising:

timing means including a high-speed clock operating in conjunction with a low-speed clock;

means for selecting a particular memory element within a group of elements including means for rotating data stored in the selected elements at a higher speed under control of the high-speed clock and means for regenerating data stored in the remainder of the elements at slow speed by the low-speed clock.

16. The combination according to claim 15 including control means for presenting the word position address of the first word of a block of words to said comparing means so that data stored in the selected memory elements are electronically rotated at high speed until the position count matches the word position address;

means for halting the rotation; and means for accessing successive words by incrementing the word position address and electronically rotating data stored in the selected memory elements one word position at a time.

* * * * *